(12) United States Patent
Johnstone

(10) Patent No.: US 8,905,165 B1
(45) Date of Patent: Dec. 9, 2014

(54) TRACK DRIVEN SUB-BASE ASSEMBLY

(71) Applicant: David Johnstone, Council Bluffs, IA (US)

(72) Inventor: David Johnstone, Council Bluffs, IA (US)

( * ) Notice: Subject to any disclaimer, the term of this patent is extended or adjusted under 35 U.S.C. 154(b) by 0 days.

(21) Appl. No.: 14/019,715

(22) Filed: Sep. 6, 2013

Related U.S. Application Data

(63) Continuation-in-part of application No. 13/205,065, filed on Aug. 8, 2011, now Pat. No. 8,550,193.

(60) Provisional application No. 61/371,437, filed on Aug. 6, 2010.

(51) Int. Cl.
*B62D 55/06* (2006.01)
*E02F 9/00* (2006.01)
*E02F 9/22* (2006.01)
*E02F 3/96* (2006.01)

(52) U.S. Cl.
CPC . *E02F 9/00* (2013.01); *B62D 55/06* (2013.01); *E02F 9/2278* (2013.01); *E02F 3/96* (2013.01)
USPC ........................... 180/9.42; 180/306; 280/831

(58) Field of Classification Search
USPC ............................ 180/9.42, 305, 306; 280/831
See application file for complete search history.

(56) References Cited

U.S. PATENT DOCUMENTS

| | | | |
|---|---|---|---|
| 5,255,752 A * | 10/1993 | Nakamura et al. | 180/6.7 |
| 6,668,964 B2 | 12/2003 | Braud | |
| 6,729,831 B1 * | 5/2004 | Kawamura et al. | 414/694 |
| 6,922,925 B2 | 8/2005 | Watanabe et al. | |
| 7,891,453 B2 * | 2/2011 | Hall et al. | 180/165 |
| 8,038,379 B2 * | 10/2011 | Yamashita et al. | 414/680 |
| 8,103,418 B2 | 1/2012 | Osswald et al. | |
| 2003/0110669 A1 | 6/2003 | Watanabe et al. | |
| 2003/0127258 A1 | 7/2003 | Lansberry | |
| 2005/0095096 A1 | 5/2005 | Curotto et al. | |
| 2008/0227344 A1 | 9/2008 | Gaither | |
| 2010/0236855 A1 | 9/2010 | Matsushita et al. | |
| 2011/0024204 A1 * | 2/2011 | Florean | 180/53.8 |
| 2012/0067660 A1 | 3/2012 | Kashu et al. | |
| 2012/0181095 A1 | 7/2012 | Lopez | |
| 2014/0027432 A1 * | 1/2014 | Hennessy | 219/202 |

* cited by examiner

*Primary Examiner* — Kevin Hurley

(74) *Attorney, Agent, or Firm* — Tyson B. Benson; Advent, LLP

(57) ABSTRACT

An assembly that is configured to receive a cab assembly is described. The assembly includes an undercarriage that is configured to hold hydraulic oil. One or more utility arms are coupled to the undercarriage frame for lifting and lowering attachments coupled to the one or more utility arms. A hydraulic pump is coupled to the undercarriage frame and is configured to operate the one or more utility arms.

18 Claims, 9 Drawing Sheets

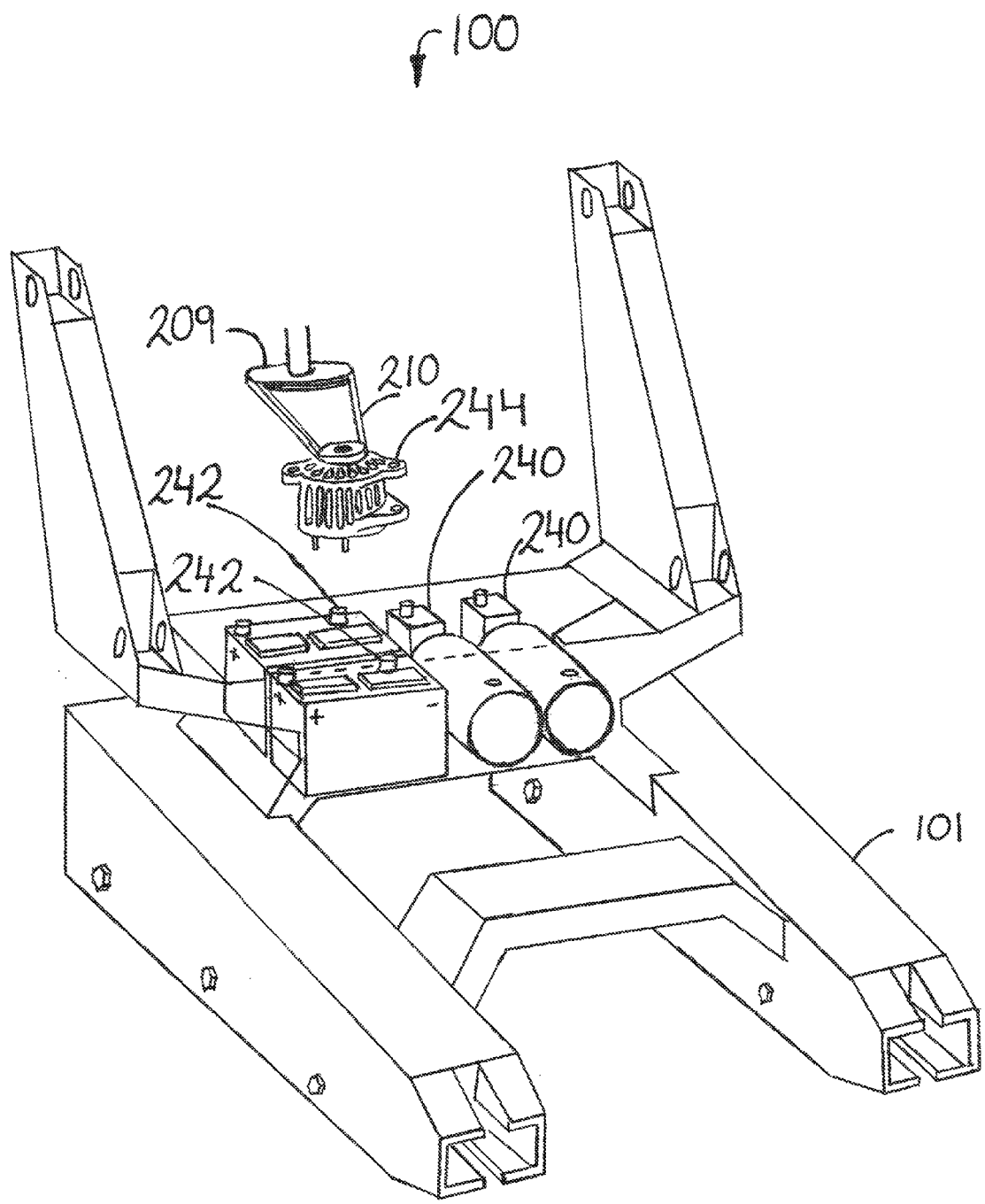

TRACK DRIVEN SUB-BASE ASSEMBLY

CROSS-REFERENCE TO RELATED APPLICATIONS

The present application is a continuation-in-part under 35 U.S.C. §120 of U.S. patent application Ser. No. 13/205,065, filed on Aug. 8, 2011, entitled "TRACK DRIVEN SUB-BASE ASSEMBLY." U.S. patent application Ser. No. 13/205,065 is herein incorporated by reference in its entirety.

BACKGROUND

Zero-turn mowers have a turning radius of approximately zero. These mowers operate by changing the speed of the drive wheels of the mower. The speed of the drive wheels are at least partially operated through two levers associated with the cab assembly of the zero-turn mower.

SUMMARY

An assembly that is configured to receive a cab assembly is described. The assembly includes an undercarriage that is configured to hold hydraulic oil. One or more utility arms are coupled to the undercarriage frame for lifting and lowering attachments coupled to the one or more utility arms. A hydraulic pump is coupled to the undercarriage frame and is configured to operate the one or more utility arms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 9 is a diagrammatic isometric view illustrating the track driven sub-base assembly in accordance with another example implementation of the present disclosure.

DETAILED DESCRIPTION

Figure 1A:
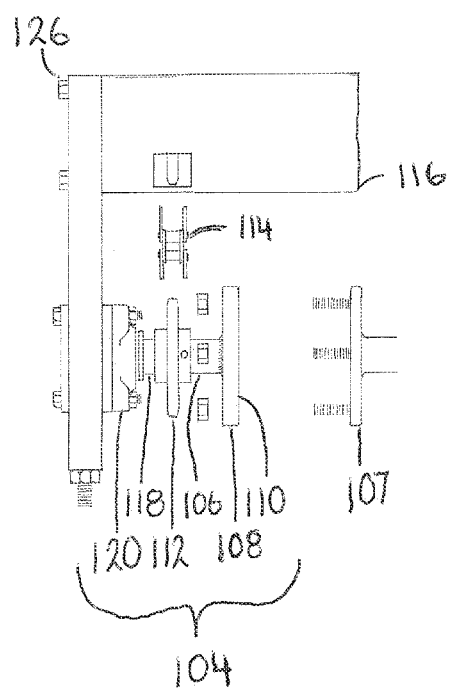
FIGS. 1A and 1B are diagrammatic partial exploded views illustrating a universal hub group and a chain adjustor of a track driven sub-base assembly.
Figure 1B:
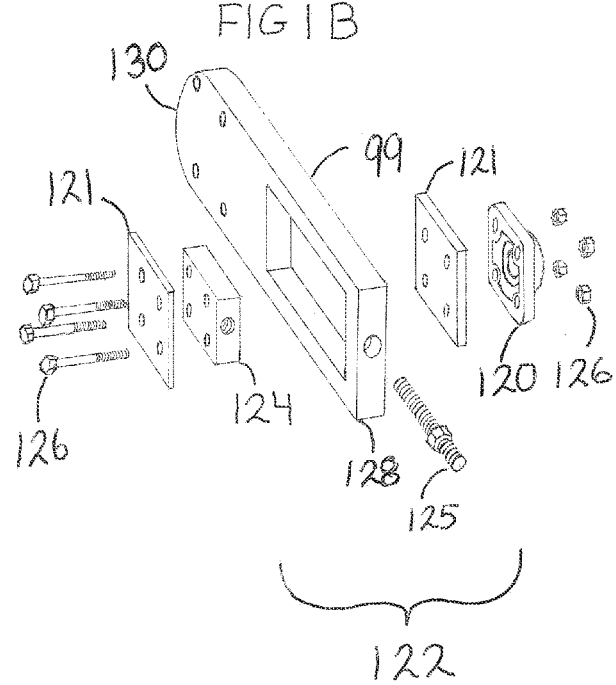
Figure 2:
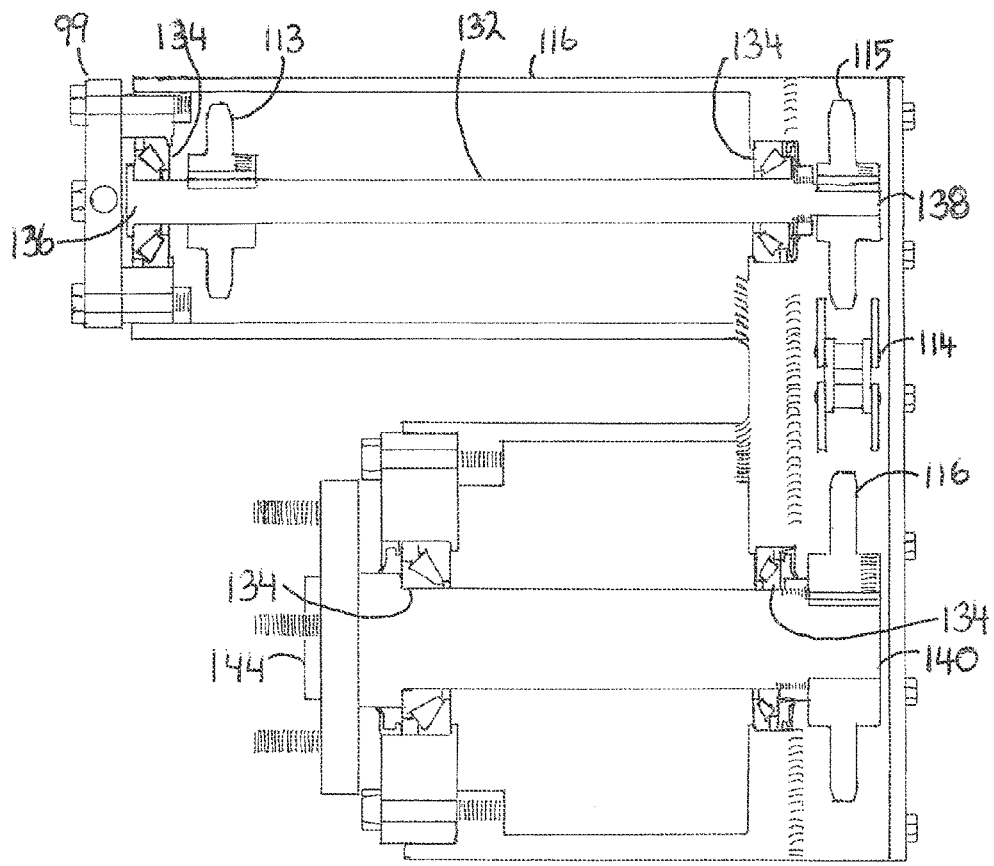
FIG. 2 is a diagrammatic partial side perspective view illustrating a universal mount beam of a track driven sub-base assembly.
Figure 3:
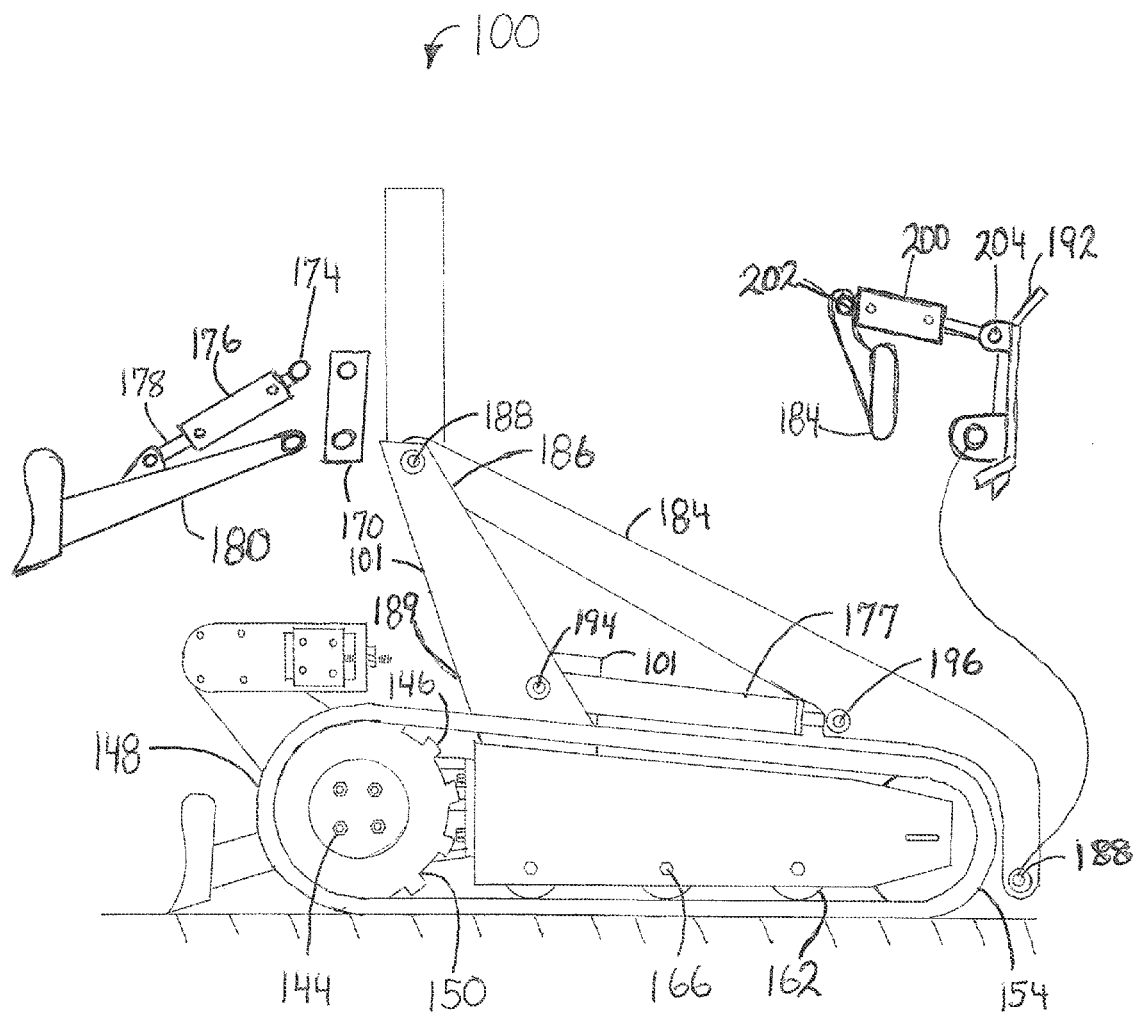
FIG. 3 is a diagrammatic partial side perspective view illustrating a track driven sub-base assembly in accordance with an example implementation of the present disclosure.
Figure 4:
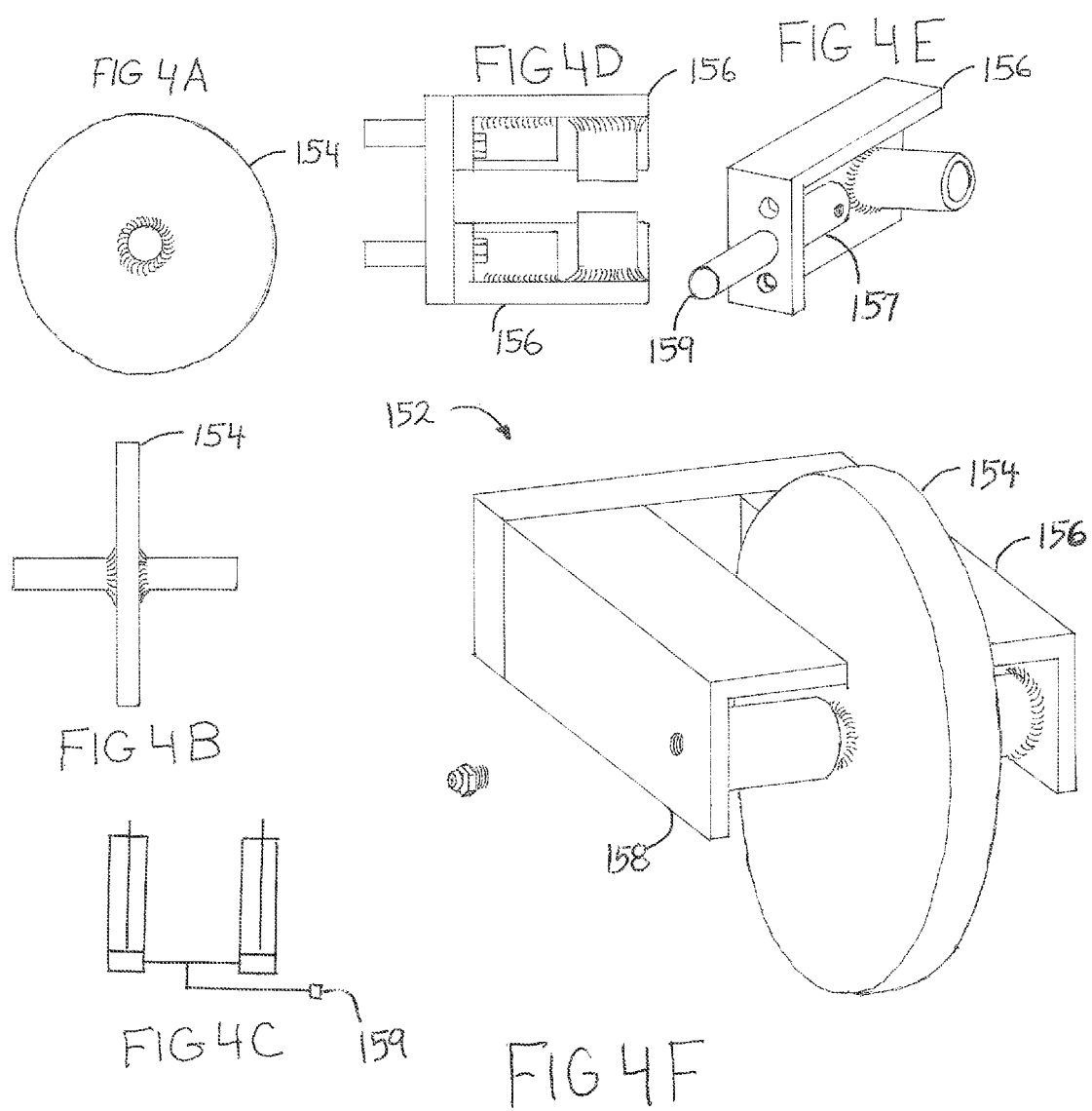
FIGS. 4A through 4F are diagrammatic partial perspective views illustrating a track adjustment mechanism of a track driven sub-base assembly.

FIGS. 1 through 9 illustrate an example track driven sub-base assembly 100 that includes an undercarriage frame 101 and a track drive 102. In an implementation, the track drive 102 receives power by removing both rear wheels of a powered device (e.g., a zero-turn mower, or the like). A universal hub group 104 is installed in the rear wheels place. The universal hub group 104 comprises a shaft 106 with a flange 108 that is configured to bolt where the powered device drive wheels were located. The first end 110 of the shaft 106 mounts to the motor driven hub 107. The sprocket 112 connects to a chain 114 that is configured to be received by a chain case 116. The second end 118 of the shaft 106 is received by a flange bearing 120 that is mounted to a chain adjustor 122.

The chain adjustor 122 comprises a sliding block 124 adjusted with a fastener 125 (e.g., bolt, screw, etc.) to a first end 128 of the universal mount beam 99. When the chain 114 is at a sufficient tension (through tightening the fasteners 125). The sliding block 124 is clamped in place between the bearing 120 and the sliding plates 121 with fasteners 126. The second end 130 of the chain adjustor 122 is fastened (e.g., bolted with four (4) bolts) to the chain case 116 (see FIG. 2).

The chain case 116 comprises an upper drive shaft 132 having tapered bearing 134 (two (2) bearing sets with seals). A first (outside) end 136 of the first sprocket 112 is fastened to the shaft 106 with keyway and set fasteners (e.g., screws). The chain 114 is connected to the sprocket 112, which is where a rear wheel of the powered device was positioned previously and around the sprocket 113 at an end 136 of the shaft 132. The second (inside) end 138 of the upper drive shaft 132 includes a sprocket 115 fastened to the shaft 132 with a keyway and set fasteners (e.g., screws). The chain 114 is connected to the sprocket 115. The drive axel 140 is held in place by two sets of tapered bearings and seals 134. The outside end 144 of the drive axel 140 includes a bolt flange 144 configured to hold a track assembly sprocket 146 configured to drive a track 148 of the track drive assembly 150 (see FIG. 3). The track drive assembly 150 is coupled to the frame 101 and configured to assist in moving (re-positioning) the frame 101 from a first position to a second position.

In an implementation, the track 148 may be a continuous band track configured to distribute the weight of the frame 101 (and associated cab assembly described herein), which allows the frame 101 (and associated cab assembly) to traverse soft ground with less likelihood of becoming stuck or sinking. For example, the track 148 may be a continuous rubber track that is driven by the track assembly sprocket 146 of track drive assembly 150, which is fastened (e.g., bolted) to the drive axel 140. A track adjustment mechanism 152 is positioned opposite of the drive axel 140 (see reference number 154 in FIG. 3) for adjusting the track tension of the track 148. The track adjustment mechanism 152 comprises a shaft and idler 154 that includes brass bushings and includes a sliding yoke 156 configured to be adjusted by a grease gun at zerk fittings 159 and grease cylinders, which is mounted to the lower end 158 of the yoke 156. The frame 101 includes multiple carrier rollers 162 (three (3) carrier rollers are shown) configured to receive the track 148. The carrier rollers 162 are each fastened with multiple fasteners. At least one of the fasteners 164 comprises a grease bolt 166 with a grease zerk.

Figure 5:
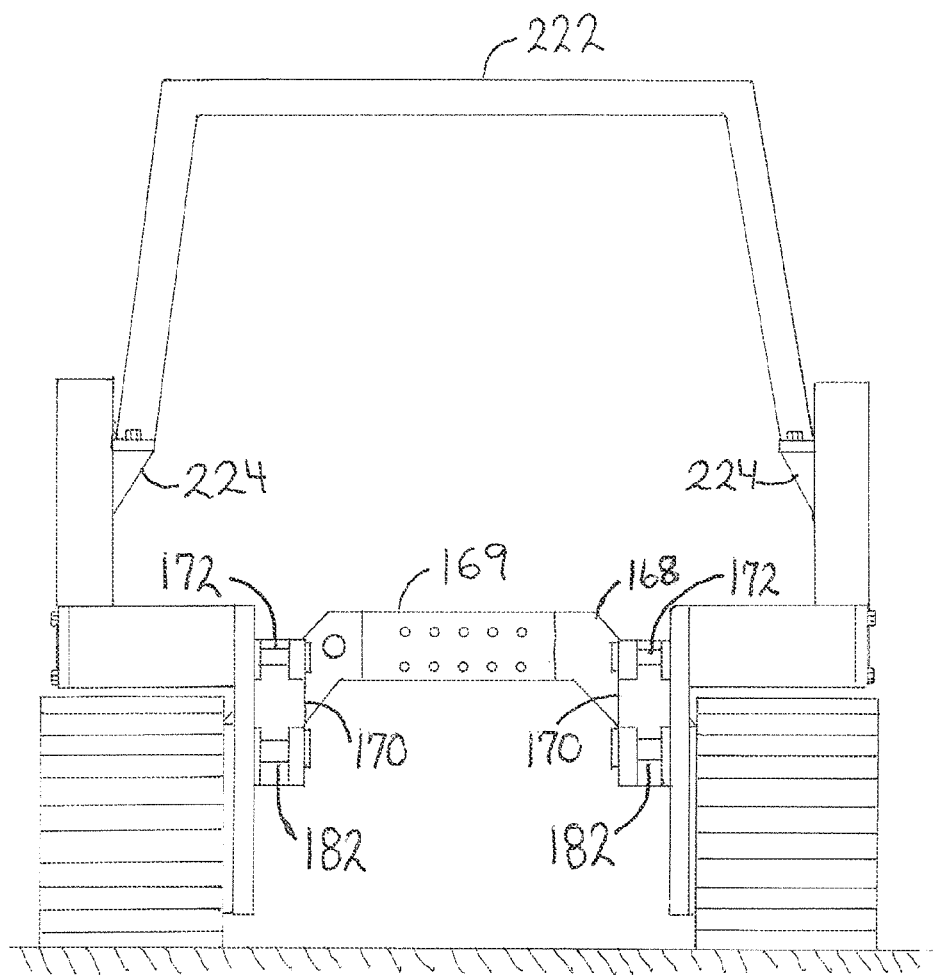
FIG. 5 is a diagrammatic partial back view illustrating the track driven sub-base assembly of FIG. 3.

As shown in FIG. 5, the crossover frame member 168 of frame 101 includes a universal mount 169 (e.g., a universal pump mount, a universal alternator mount) and multiple (2) mounts 170. Each mount 170 includes two (2) upper mounts 172 for the base end 174 of two (2) double acting hydraulic cylinders 176 (see FIG. 3). The rod end 178 of each cylinder 176 is mounted to the stabilizer push blade arms 180. The stabilizer push blade arms 180 are configured to stabilize the assembly 100 during operation (e.g., to prevent sliding or lifting of the assembly 100 when a back-hoe is attached to the assembly 100, etc.) The two (2) lower mounts 182 are configured to hold the stabilizer push blade arms 180. When the hydraulic cylinders 176 refract, the stabilizer push blade arms 180 are configured to move up (with respect to the ground). Conversely, as the cylinders 176 extend, the stabilizer push blade arms 180 are configured to move down. The hydraulic cylinders 176 and the stabilizer push blade arms 180 are held in position by removable fasteners.

The assembly 100 further includes one or more utility arms 184 that are mounted in the upper portion 186 of the frame 101 with one or more fasteners (pins 188). An attachment pivot 192 is attached to each utility arm 184 by way of pins. The base end 194 of the cylinders 177 are attached (pinned) to the lower part of the frame 101, and the rod end 196 of the cylinders 177 are attached under at least one of the utility arms 184. The utility arms 184 move up as the cylinders 177 extend, and the utility arms 184 move down as the cylinders 177 retract. Multiple (two (2) are shown) double acting hydraulic cylinders 200 are coupled to the attachment pivot 192. The base end 202 of the cylinders 200 are attached (pinned) to the utility arms 184. The rod end 204 of the cylinders 200 are pinned to the attachment pivot 192. At least one utility arm 188 includes a set of hydraulic tubes (not shown) for attachments that require hydraulic connections (e.g., back hoe, auger, etc.).

Figure 7:
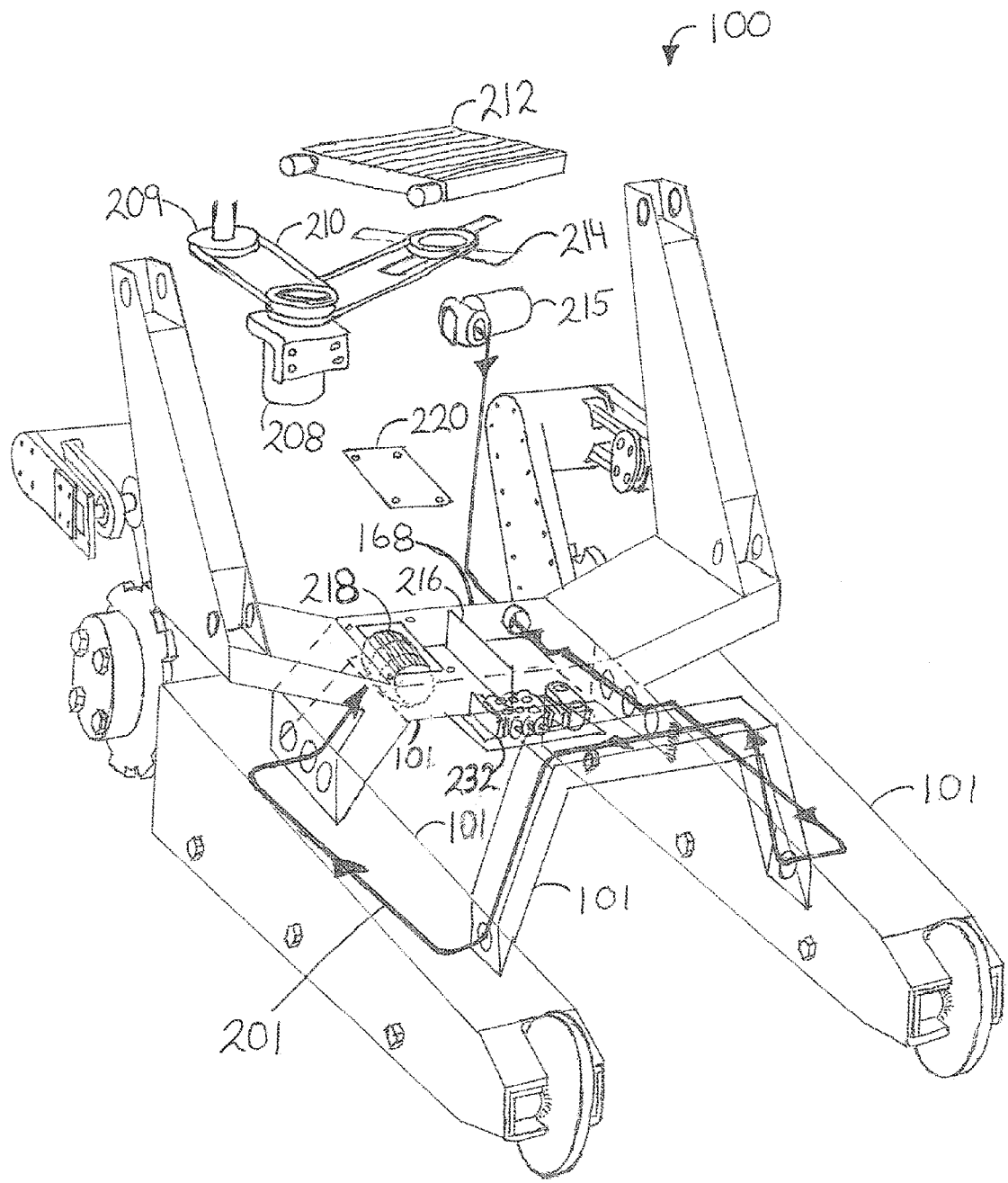
FIG. 7 is a diagrammatic partial elevated perspective view illustrating the track driven sub-base assembly of FIG. 3.

The frame 101 includes a hydraulic pump 208 mounted to the universal pump mount 169 that is configured to operate the one or more utility arms 184 by displacing hydraulic oil through a hydraulic system. In an implementation, the hydraulic pump 208 is driven (e.g., actuated) through a pulley 209 of a powered device power source (e.g., engine, battery). Frame 101 further includes a hydraulic reservoir 201 for storing hydraulic oil (see FIG. 7). FIG. 7 further illustrates an example hydraulic path for the return hydraulic oil through the reservoir 201 (see arrows in the frame 101). The pulley 209 may be a pulley positioned on the bottom side (proximate to the ground) of an engine of a zero-turn mower (e.g., zero-turn mower cab assembly positioned over and coupled to the assembly 100 through the frame 101). This engine may have been previously configured to power the grass cutting deck of the zero turn mower. The universally mountable hydraulic pump 208 includes a "V" belt 210 and a set spring loaded idler pulley, which is configured to maintain sufficient belt tension. In an implementation, the hydraulic pump 208 may be a two (2) section unit hydraulic pump that is configured to take oil from a hydraulic tank through a strainer 218. The first section of the pump 208 is configured to supply the oil to the stack valve 232, which is operated by cable or hydraulic pilot pressure. The stack valve 232 is configured to operate the utility arms 184, the attachment tilt, and the stabilizer push blade arms 180. The other (e.g., second) section of the hydraulic pump 208 is configured to operate (e.g., power, etc.) the attachments that require hydraulic connections (e.g., power auger, rotary brush, trencher, etc.). Once the hydraulic oil passes through the valve 232, the oil passes through a cooler 212. The cooler 212 has a belt driven fan and is operably connected to the pump pulley 214. Once the oil passes through the cooler 212, the oil passes through an oil filter 215 and then returns to the hydraulic reservoir 201. The hydraulic reservoir 201 includes a baffle 216 positioned in the center of the crossover frame member 168. The baffle 216 allows the hydraulic oil to first travel to the strainer 218, the pump 208, the functions, and then to pass to the cooling and filtration system (not shown). Access to the pump strainer 218 is located proximate to a top side of the crossover frame member 168 through cover 220 (e.g., removing cover 220. In implementations, the utility arms 184 may include a hydraulic lift that is limited by a relief valve. In other implementations, the hydraulic pump 208 may be driven by a drive shaft.

Figure 6:
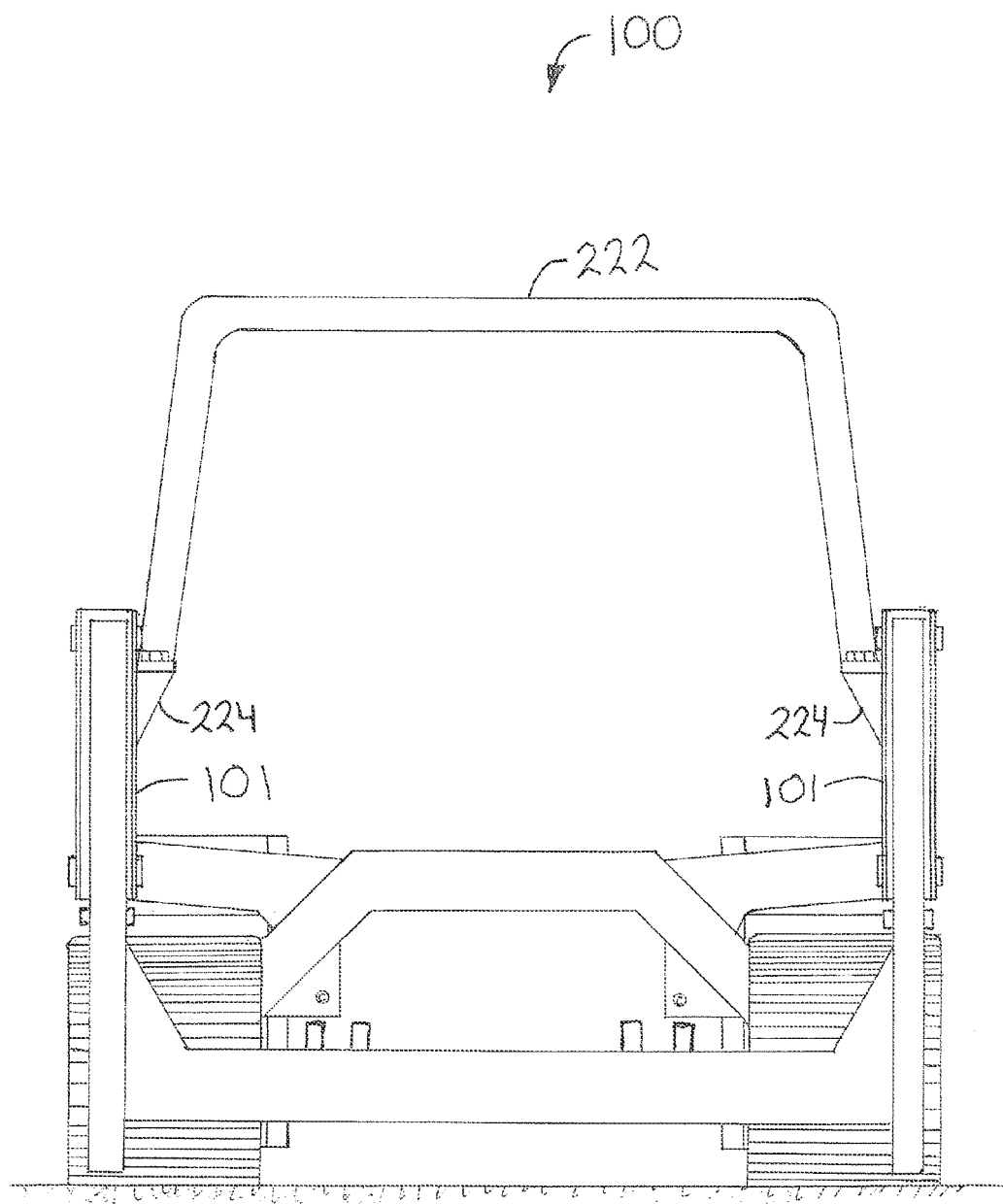
FIG. 6 is a diagrammatic partial front view illustrating the track driven sub-base assembly of FIG. 3.

As shown in FIG. 6, the assembly 100 further includes an overhead guard 222. The overhead guard 222 includes a bolt mount 224 that is located and mounted proximate to the inside portion of the frame 101. In an implementation, the overhead guard 222 may be fastened to the frame 101 with multiple fasteners (e.g., bolts, screws, etc.).

The assembly 100 further includes a sub-base assembly 228. The sub-base assembly 228 comprises the undercarriage frame 101 that is at least substantially oil-tight and functions as a hydraulic reservoir (e.g., reservoir 201). Thus, a portion of the undercarriage frame 101 may be at least partially hollow to store hydraulic oil and may be constructed from a suitable material, such as metal, plastic, or the like. In implementations, the sub-base assembly 228 may be a tubular undercarriage frame, or the like. The frame 101 is configured to receive components (e.g., hydraulic pump 208, etc.) and/or parts that are configured to assist in lifting and lowering the utility arms 184, as well as the auxiliary hydraulic supply for attachments (e.g., auger, trenchers, etc.) that can be mounted to the utility arms 184. The chain 114, the drive axel 140, track assembly sprocket 146, track adjustment mechanism 152, shaft 154, and so forth, may be coupled directly or indirectly to the frame 101.

Figure 8:
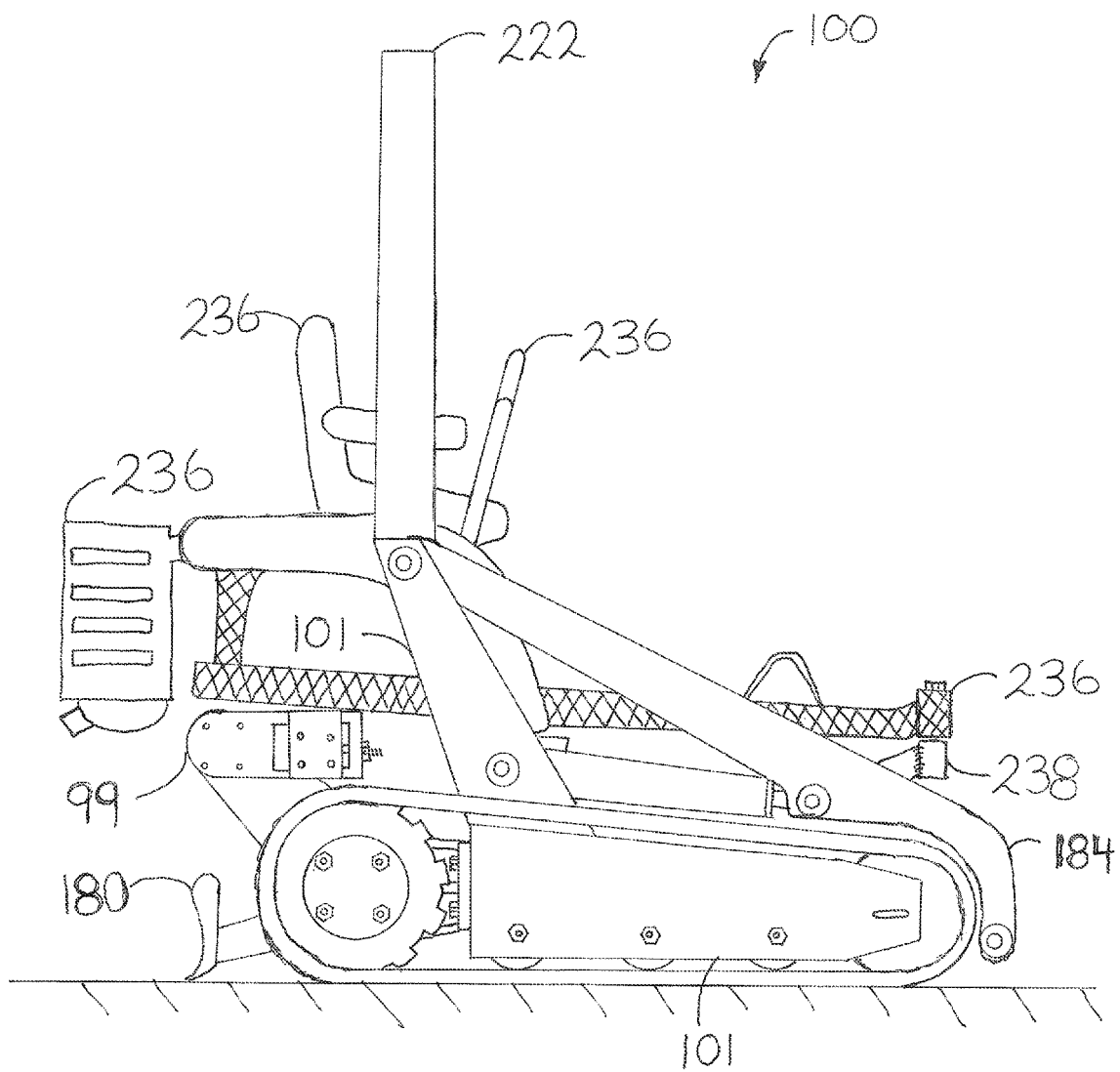
FIG. 8 is a diagrammatic partial side view illustrating the track driven sub-base assembly of FIG. 3, wherein the track driven sub-base assembly includes a cab assembly positioned over the frame.

As shown in FIG. 8, the assembly 100 is configured to receive a cab assembly 236 from any suitable powered device. For example, the assembly 100 (e.g., the frame 101) may receive a cab assembly 236 of a zero-turn mower. The cab assembly 236 is at least partially coupled to the frame 101 by way of at least one arm 238 (with a fastener connecting the cab assembly 236 to the arm 238. The at least one arm 238 is coupled to the frame 101. A power source from the zero-turn mower may be utilized to at least partially power the assembly 100. Once the frame 101 receives the cab assembly 236, the pulley 209 (see FIG. 7) that previously drove the mower deck of the zero-turn mower (e.g., via a belt or drive shaft) may be utilized to at least partially provide drive to the hydraulic pump 208 and/or an alternator 244 to control arm functionality, motors, and/or attachments connected with the assembly 100.

FIG. 9 illustrates another implementation of the track driven sub-base assembly 100. As shown, the assembly 100 may include at least one motor driven pump assembly 240 (e.g., a direct current (DC) pump assembly, an alternating current (AC) pump assembly), at least one battery 242 (e.g., a deep cycle battery (i.e., a 12 V battery, a 24 V battery, a 36 V battery, etc.)), and an alternator 244. The alternator 244 can be mounted to the frame 101 utilizing the universal mount 169. As shown, the pulley 209, which is driven by a powered device power source, actuates the alternator 244 through the belt 210 to at least partially power the battery 242. The battery 242 (or batteries 242) is configured to at least partially power a respective motor driven pump assembly 240. The motor driven pump assembly 240 (or assemblies 240) control one or more operations of the assembly 100. For example, the pump assembly 240 can control operation of the attachments of the assembly 100 (e.g., arms 180, utility arms 184, cylinder 200, or other attachments that can attach to the attachment pivot 192). In some implementations, the alternator 244 may be driven by a drive shaft and/or a hydraulic pump 208.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An assembly, comprising:
   an undercarriage frame having a hydraulic reservoir therein;
   one or more utility arms coupled to the undercarriage frame for lifting and lowering attachments coupled to the one or more utility arms; and
   a hydraulic pump coupled to the undercarriage frame and configured to operate the one or more utility arms, the hydraulic pump is configured to be actuated by at least one battery, the at least one battery configured to be powered by an alternator configured to be coupled to the undercarriage frame,
   wherein the undercarriage frame is configured to receive a cab assembly.

2. The assembly as recited in claim 1, further comprising a track drive assembly coupled to the undercarriage frame and configured to assist in re-positioning the undercarriage frame, the track drive assembly including at least one track.

3. The assembly as recited in claim 2, wherein the track is a continuous band track.

4. The assembly as recited in claim 1, wherein the hydraulic pump is a two section hydraulic pump.

5. The assembly as recited in claim 4, wherein a first section of the two section hydraulic pump is configured to operate the one or more utility arms and a second section of the two section hydraulic pump is configured to operate attachments associated with the one or more utility arms.

6. The assembly as recited in claim 1, wherein the hydraulic pump is a universally mountable hydraulic pump.

7. An assembly comprising:
   an undercarriage frame having a hydraulic reservoir therein;
   one or more utility arms coupled to the undercarriage frame for lifting and lowering attachments coupled to the one or more utility arms;
   a hydraulic pump coupled to the undercarriage frame and configured to operate the one or more utility arms, the hydraulic pump is configured to be actuated by at least one battery, the at least one battery configured to be powered by an alternator configured to be coupled to the undercarriage frame; and
   a track drive assembly coupled to the undercarriage frame and configured to assist in re-positioning the undercarriage frame, the track drive assembly including at least one track,
   wherein the undercarriage frame is configured to receive a cab assembly.

8. The assembly as recited in claim 7, wherein the track is a continuous band track.

9. The assembly as recited in claim 7, wherein the hydraulic pump is a two section hydraulic pump.

10. The assembly as recited in claim 9, wherein a first section of the two section hydraulic pump is configured to operate the one or more utility arms and a second section of the two section hydraulic pump is configured to operate attachments associated with the one or more utility arms.

11. The assembly as recited in claim 7, wherein the hydraulic pump is configured to be actuated by a pulley of a powered device power source, the powered device power source coupled to the cab assembly.

12. The assembly as recited in claim 7, wherein the hydraulic pump is a universally mountable hydraulic pump.

13. An assembly for receiving a cab assembly, the assembly comprising:
   an undercarriage frame having a hydraulic reservoir therein;
   one or more utility arms coupled to the undercarriage frame for lifting and lowering attachments coupled to the one or more utility arms;
   a hydraulic pump coupled to the undercarriage frame and configured to operate the one or more utility arms, the hydraulic pump is configured to be actuated by at least one battery, the at least one battery configured to be powered by an alternator configured to be coupled to the undercarriage frame; and
   a cab assembly disposed over the undercarriage frame.

14. The assembly as recited in claim 13, further comprising a track drive assembly coupled to the undercarriage frame and configured to assist in re-positioning the undercarriage frame, the track drive assembly including at least one track.

15. The assembly as recited in claim 13, wherein the hydraulic pump is a two section hydraulic pump.

16. The assembly as recited in claim 15, wherein a first section of the two section hydraulic pump is configured to operate the one or more utility arms and a second section of the two section hydraulic pump is configured to operate attachments associated with the one or more utility arms.

17. The assembly as recited in claim 13, wherein the hydraulic pump is configured to be actuated by a pulley of an engine coupled to the cab assembly.

18. The assembly as recited in claim 13, wherein the hydraulic pump is a universally mountable hydraulic pump.

* * * * *